R. J. ALTGELT.
WHEELED PLOW.
APPLICATION FILED APR. 3, 1920.
1,377,049.
Patented May 3, 1921.
3 SHEETS—SHEET 3.
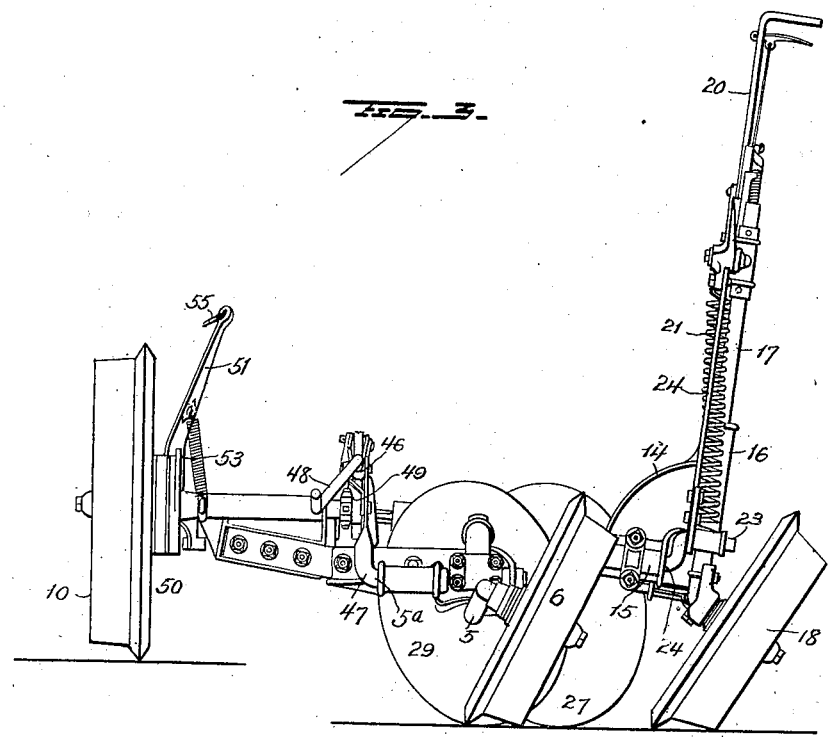
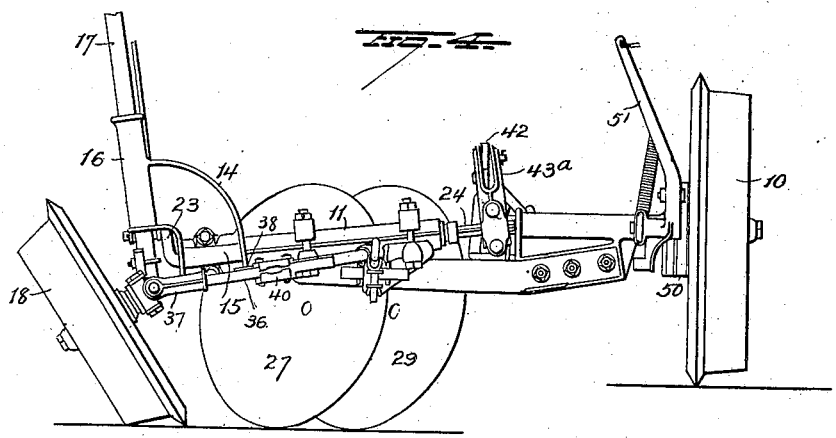

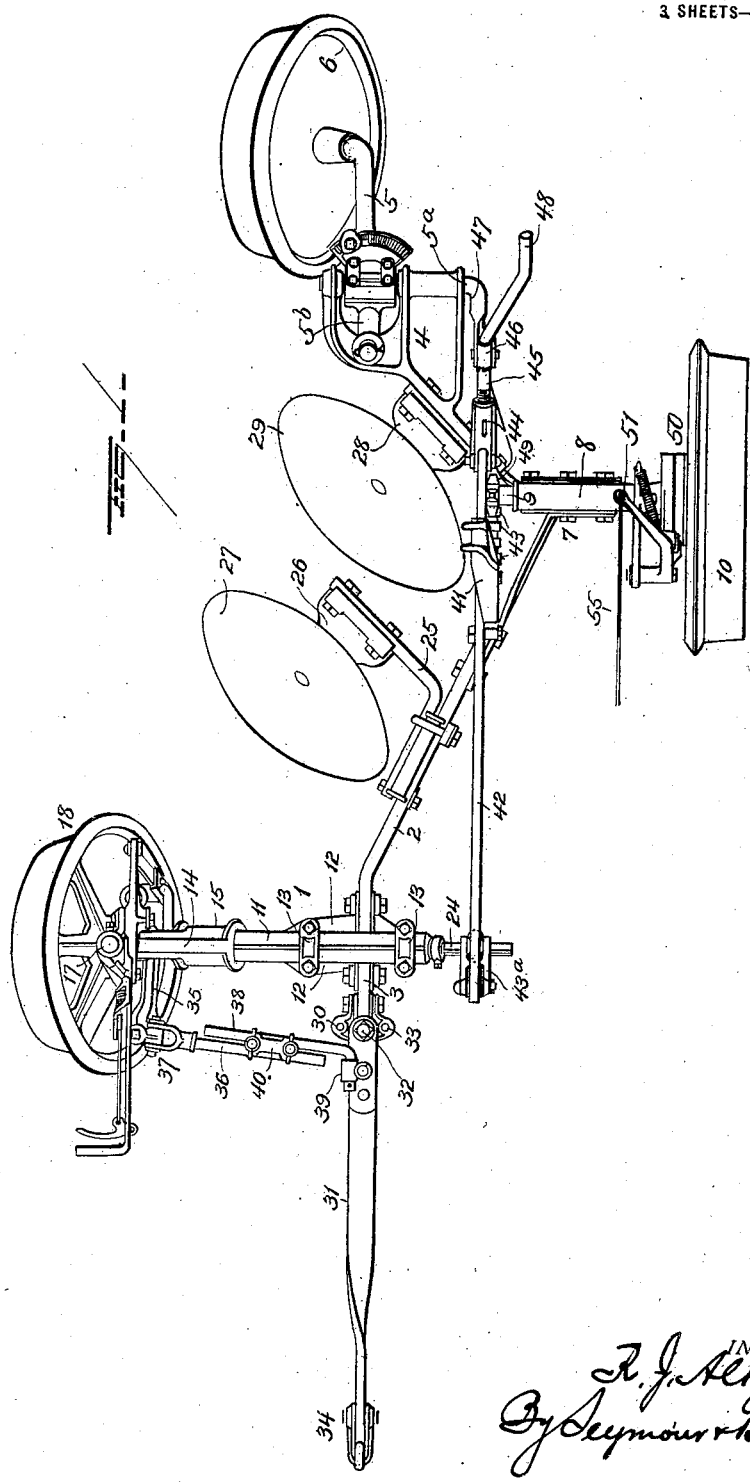

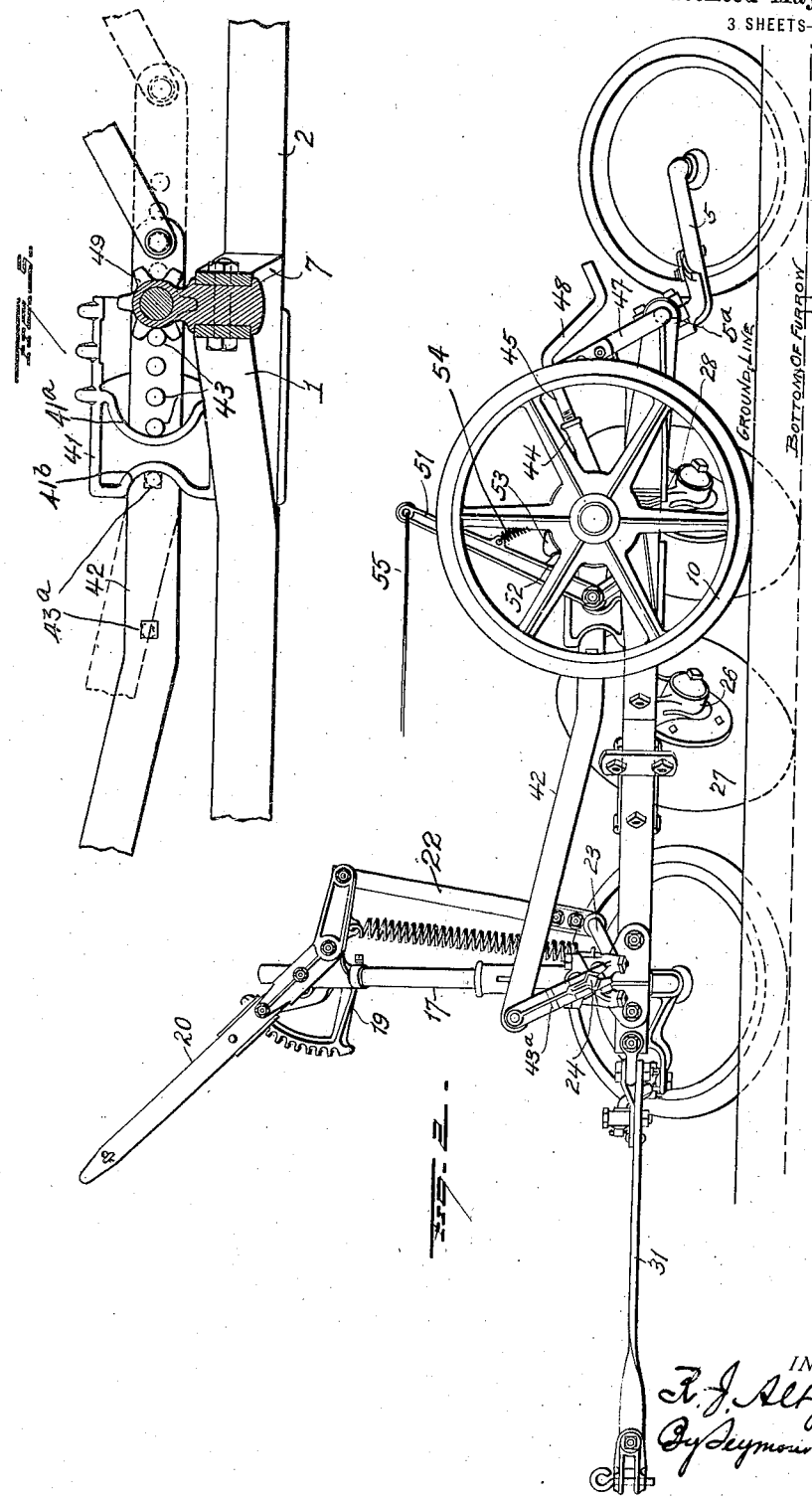

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

WHEELED PLOW.

1,377,049.   Specification of Letters Patent.   Patented May 3, 1921.

Application filed April 3, 1920. Serial No. 371,076.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Wheeled Plows; and I do hereby declare the following to be a full, clear, and exact description of the invention, such as will enable others skilled in the art to which it appertains to make and use the same.

This invention relates to improvements in wheeled plows and more particularly to such as employ power lift mechanism operable from one of the ground wheels,—one object of the invention being to provide a wheeled plow having a straight land-wheel axle, with simple and efficient lift mechanism deriving its power from the land wheel, whereby lost-motion incident to the "spring" of a crank axle and to the wear in couplings employed between power means and crank axles, shall be avoided.

A further object is to provide power lift mechanism for a plow, and particularly a disk-gang wheeled plow, which shall comprise a minimum number of parts and which shall be operable to raise the plow frame upon the furrow wheels with power derived from the land wheel.

With these and other objects in view, the invention consists in certain novel features of construction and combinations of parts as hereinafter set forth and pointed out in the claims.

In the accompanying drawings; Figure 1 is a plan view of a plow structure showing an embodiment of my invention; Fig. 2 is a side elevation; Fig. 3 is a rear view; Fig. 4 is a front view, and Fig. 5 is an enlarged detail view, partly in section, showing parts of the power transmitting mechanism.

1 represents a plow frame comprising an approximately U-shaped frame beam 2 constructed and arranged at its forward end, as at 3, to lie in a plane parallel with the longitudinal axis of the plow structure and substantially coincident with the line of draft of the same. A bracket 4 is secured to the diagonal rear member of the frame bar and in this bracket, a shaft $5^a$ constituting in effect, a horizontal portion of a crank axle 5 is journaled, the spindle portion of this axle being mounted in the hub of a rear furrow or follower wheel 6 and the standard portion of said axle being mounted in a sleeve $5^b$ clamped to the shaft or axle section $5^a$. Projecting laterally from an intermediate portion of the plow frame is a bracket 7 which serves to support a sleeve 8 through which an axle 9 for a land wheel 10 passes.

A tubular bar 11 which is inclined somewhat when the plow is in working position, as indicated in Fig. 4, is rigidly secured to the forward portion of the frame beam 2 through the means of bracket 12 and clips 13. At one end of the tubular frame bar 11, a bracket 14 is located and provided with a sleeve portion 15 rigidly secured to said tubular frame bar. The bracket 14 is also provided with an upright sleeve portion 16, through which a standard axle 17 for a front furrow wheel 18 passes. A segment bracket 19 is mounted on the standard axle, and to this bracket, a hand lever 20 is pivoted (and adapted to coöperate with the segment of said bracket) and the short arm of this lever is connected by a spring 21 with the plow frame,—said short arm of the lever being also connected by rod 22 with a crank arm 23 on a shaft 24 passing through and rotatable in the tubular bar 11. This shaft is normally prevented from turning by means hereinafter explained, so that the lever 20 mounted upon the standard axle 17 is connected with the frame through the medium of the rod 22, shaft 24 and tubular bar 11, and the said lever, thus connected with the frame, may be utilized for leveling purposes.

To the forward diagonal portion of the frame beam 2, an arm or bracket 25 is secured and carries a standard 26 having a mounting for the hub of a forward earth-working disk 27. A standard 28 for a rear earth-working disk 29 is secured to the rear diagonal portion of the frame.

A clevis 30 is connected with the forward extension 3 of the frame beam 2 and with this clevis, a draw-bar 31 is connected by a vertical pivot 32 at any one of a series of horizontally arranged holes 33. Suitable means (such as a shackle 34) is provided whereby the forward end of the draw bar may be connected with a tractor.

Secured to the lower portion of the standard axle is a forwardly projecting arm 35 and with the forward end of this arm, an adjusting rod 36 is connected through the medium of universal coupling devices 37. An adjusting rod 38 is pivotally connected at 39 with the draw bar 31. The two rods are disposed parallel with each other and are normally secured against relative movement by means of clamping devices 40. By connecting the draw bar 31 with the standard axle 17 by means of the devices above described, said draw bar will be maintained in fixed position relatively to the line of draft and the adjustment in which the rods 36—38 may be secured by the clamping means 40 will not be interfered with by the raising and lowering of the furrow-side of the frame. Lateral adjustment of the draw bar will be permitted by loosening the clamping means 40 and moving the rods 36 and 38 (or one of them) longitudinally and then again clamping them.

Secured upon the intermediate portion of the frame beam 2, is a guide bracket 41 through which a longitudinally movable actuating bar 42 passes freely, said bar being provided with a plurality of laterally projecting pins 43 (four such pins being shown in the drawing), forming a rack, and the pin at the forward end of the series of pins is adapted to engage a curved portion 41$^a$ of the bracket 41 when the bar 42 is at the forward end of its throw. The bar 42 is also provided with a pin 43$^a$ which engages the curved portion 41$^b$ of the bracket 41 when said bar reaches the rear end of its throw. The forward portion of the actuating bar 42 is pivotally and loosely connected with a crank arm 43$^a$ secured to the forward transverse shaft 24 and the rear end of said bar is connected with a sleeve 44, which latter is internally threaded and receives the threaded portion of a manually operable shaft 45. This shaft is mounted to turn freely in a sleeve 46 pivotally supported by an arm 47 of the shaft or crank axle 5$^a$ of the rear furrow or follower wheel 6. The shaft 45 is not longitudinally movable through the sleeve 46 and it is provided with a crank handle 48.

The land-wheel axle 9 carries at its inner end, a pinion 49 which, in the present instance is illustrated as having six teeth. The outer end portion of the axle 9 is adapted to be connected with the land wheel 10, through the medium of manually controllable clutch devices represented at 50. These clutch devices may be of any suitable type and their control lever 51 is provided with a part 52 to coöperate with a part 53, of the clutch devices, a spring 54 being employed to move the lever to position to cause engagement of said parts 52 and 53, and a cable 55 or similar device, is connected with the control lever for operating it. When the plow is in normal working position, the pin at the rear end of the series of pins forming the rack will be in engagement with the pinion 49 approximately in line with the axis of the latter and the pin at the forward end of the series will be in engagement with the curved portion 41$^a$ of the bracket 41.

To cause the plow to be raised with the use of the power lift mechanism, the operator will pull the cable 55 and thus actuate the control lever to operate the clutch devices and lock the shaft or axle 9 to the land wheel 10. As the plow now moves forwardly, motion will be transmitted from the land wheel to the shaft or axle 9 to rotate the latter and the pinion 49, meshing with the rack formed by the pins 43, will cause the actuating bar 42 to move lengthwise from the position shown in full lines in Fig. 5 to the dotted line position. During the first part of the rearward movement of the actuating bar, the forward pin of the rack will ride downwardly on the curved portion 41$^a$ of the bracket 41 and during the remainder of the rearward throw of said bar, it will ride on the bottom of the bracket 41 in a plane under the pinion 49. The rearward movement of the actuating bar will cause rotary movement of the shaft 24, such movement being transmitted from the actuating bar through the medium of the crank arm 43$^a$. Motion will be transmitted from the crank 23 of shaft 24 to the forward portion of the plow frame in the manner previously explained to raise said frame in a manner to tilt the same transversely and elevate the earth-working disks from the ground. During the same rearward movement of the actuating bar, motion will be transmitted through the sleeve 33 and shaft 45, to the arm 47 of the rear crank axle 5$^a$, thus causing the lifting of the rear portion of the plow frame. By adjusting the shaft 45 relatively to the sleeve 44, the position of the crank axle 5 may be altered, and thus adjustment of the frame to regulate or adjust the plow for depth of plowing may be readily effected.

During the lifting operations above described, the rack pins will move in a plane below that of the axis of the pinion 49 as previously explained and when the rearward throw of the actuating bar shall have been completed, the pin 43$^a$ will engage the curved portion 41$^b$ of the bracket 41 and the bar 42 will be raised by the pinion 49 until the rear pin of the rack approximately alines with the axis of the pinion, and this relation will be maintained by engagement of the part 52 on the control lever with the part 53 on a member of the clutch devices,— with which member the axle or shaft 9 is connected.

To release and lower the plow frame, the operator will again operate the clutch devices to release the shaft 9 and connect the same with the land wheel. As the plow now moves forwardly, the pinion will be rotated in the same direction as before but the actuating bar will be raised slightly so that it may ride under the top of the bracket 41 and the rack pins will move in a plane above that of the axis of said pinion during the forward movement of said actuating bar. When the plow shall have descended to working position, it will be held in such position by the coöperation of the control and clutch devices and the rack-and-pinion gearing.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a wheeled frame including a land wheel and a straight axle therefor, a furrow wheel and an axle therefor, and earth-working means carried by said frame, of an actuating bar, rack-and-pinion gearing between said actuating bar and the straight land-wheel axle, connections between said actuating bar and the axle of said furrow wheel and the frame, whereby the furrow side of the frame will be raised when said actuating bar is moved in one direction by the rack-and-pinion gearing, and means for controlling the rotation of the land-wheel axle by the land wheel.

2. The combination with a wheeled frame including a land wheel, a straight axle therefor, front and rear furrow wheels, and axles therefor, earth-working means carried by said frame, and means for connecting said straight axle with the land wheel, of an actuating bar, rack-and-pinion gearing between said actuating bar and straight land-wheel axle, and connections between respective ends of said actuating bar and the respective furrow wheel axles and the frame, whereby the frame will be tilted transversely and thus raised when the actuating bar is moved in one direction.

3. The combination with a wheeled frame including a furrow wheel, an axle therefor, a land wheel, and a straight axle therefor, means for connecting said straight axle with the land wheel, and earth-working means carried by the frame, of an actuating bar, rack-pins projecting laterally therefrom, a pinion carried by the straight land-wheel axle and meshing with said rack-pins, said rack-pins normally adapted to rest approximately in line with the axis of said pinion, and connections between said actuating bar and furrow wheel axle and frame, whereby the frame will be raised or lowered when the actuating bar is moved in one direction or the other.

4. The combination with a wheeled frame including a land-wheel, a straight axle therefor, front and rear furrow wheels, and axles therefor, means for connecting said straight axle with the land-wheel, and earth working means carried by said frame, of an actuating bar, connections between respective ends of said actuating bar and the respective furrow wheel axles and the frame, adapted to effect the raising or lowering of the furrow side of the frame when the actuating bar is moved in one direction, or the other, and rack-and-pinion gearing between said actuating bar and the straight land wheel axle, the rack portion of said gearing carried by the actuating bar, the latter being adapted when moved in one direction to cause the rack to move under the pinion and when moved in the other direction to travel over said pinion.

5. The combination with a wheeled frame including a land wheel, an axle therefor, a furrow wheel, and a standard axle therefor, means for connecting the land-wheel axle with the land wheel, and earth-working means carried by said frame, of an actuating bar, a shaft mounted on the frame, lifting connections between said shaft and said standard axle, a crank arm on said shaft and with which the forward end of the actuating bar is connected, and rack-and-pinion gearing between the actuating bar and the land-wheel axle for moving the actuating bar longitudinally to cause the raising or lowering of the frame relatively to the standard axle of the furrow wheel.

6. The combination of a wheeled frame including an approximately U-shaped body portion, a land wheel, a revoluble axle therefor, a forward furrow wheel, a standard axle therefor, a rear furrow wheel, and a crank axle for the latter, a longitudinally movable actuating bar, means connecting the latter with the rear furrow wheel crank axle, lifting connections between said actuating bar and the standard axle of the forward furrow wheel and the frame, a rack carried by the actuating bar, a pinion to mesh with said rack, carried by the land-wheel axle, and means for connecting the last-mentioned axle with the land wheel.

In testimony whereof I have signed this specification in the presence of two subscribing witnesses.

RUDOLPH J. ALTGELT.

Witnesses:
 KATHRYN BOUDINARD,
 ANNA M. WARTHA.